(12) United States Patent
Brindejonc

(10) Patent No.: US 8,075,269 B2
(45) Date of Patent: Dec. 13, 2011

(54) HELICOPTER PROVIDED WITH A PLURALITY OF LIFT ELEMENTS EACH PROVIDED WITH A RESPECTIVE TAB FOR CONTROLLING THE ANGLES OF INCIDENCE OF ITS BLADES

(75) Inventor: Anne Brindejonc, Marignane (FR)

(73) Assignee: Eurocopter, Marignane Cedex (FR)

( * ) Notice: Subject to any disclaimer, the term of this patent is extended or adjusted under 35 U.S.C. 154(b) by 508 days.

(21) Appl. No.: 12/392,135

(22) Filed: Feb. 25, 2009

(65) Prior Publication Data
US 2009/0214342 A1 Aug. 27, 2009

(30) Foreign Application Priority Data
Feb. 27, 2008 (FR) .................................... 08 01077

(51) Int. Cl.
*B63H 3/00* (2006.01)
(52) U.S. Cl. ........................................................ 416/104
(58) Field of Classification Search .................. 416/104, 416/108, 111
See application file for complete search history.

(56) References Cited

U.S. PATENT DOCUMENTS

| 2,481,750 A | 9/1949 | Hiller, Jr. et al. |
| 2,534,353 A | 12/1950 | Hiller, Jr. et al. |
| 2,818,123 A | 12/1957 | Hiller, Jr. |
| 6,135,713 A * | 10/2000 | Domzalski et al. ............. 416/23 |

FOREIGN PATENT DOCUMENTS

| DE | 2409227 | 9/1975 |
| GB | 735571 | 8/1955 |

OTHER PUBLICATIONS

French Search Report dated Oct. 15, 2008 from corresponding FR 0801077.

* cited by examiner

*Primary Examiner* — Jenny L Wagner
(74) *Attorney, Agent, or Firm* — Brooks Kushman P.C.

(57) ABSTRACT

The present invention relates to a helicopter provided with a main rotor (1) having at least two blades (10, 20), each blade (10, 20) being provided with attachment means (11, 21) attaching it to a hub (2) of the rotor (1). The helicopter is provided with one lift element (12, 22) per blade (10, 20), said lift element being provided with a tiltable tab (19, 29), each lift element (12, 22) being mechanically connected to a single blade (10, 20) to vary the pitch of said single blade (10, 20).

24 Claims, 6 Drawing Sheets

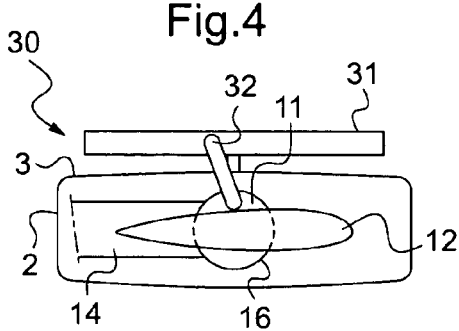
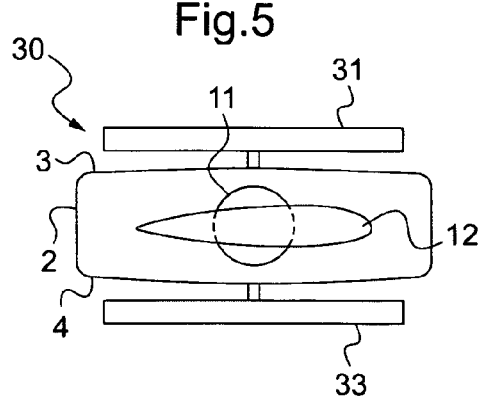
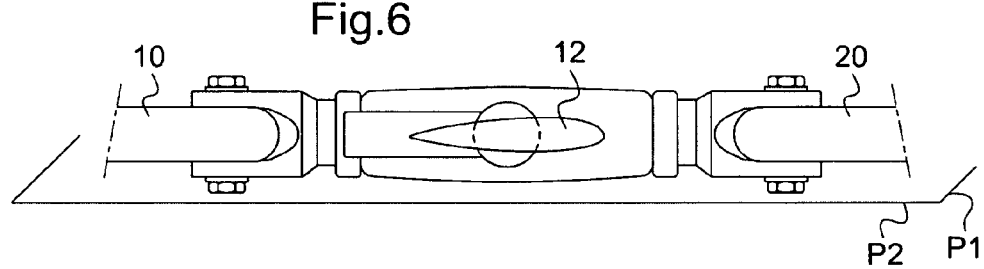
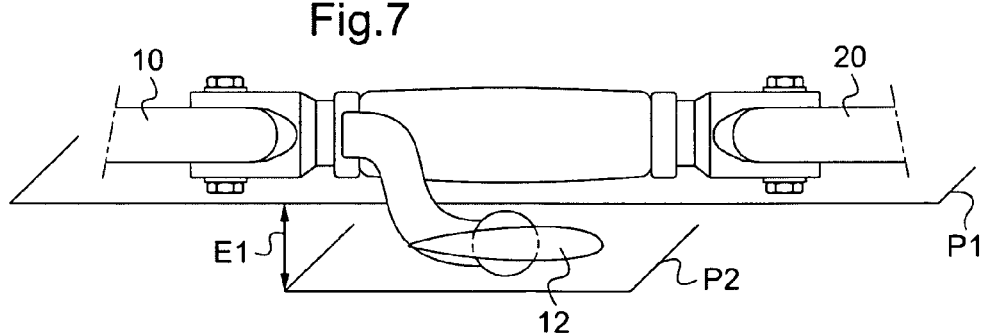
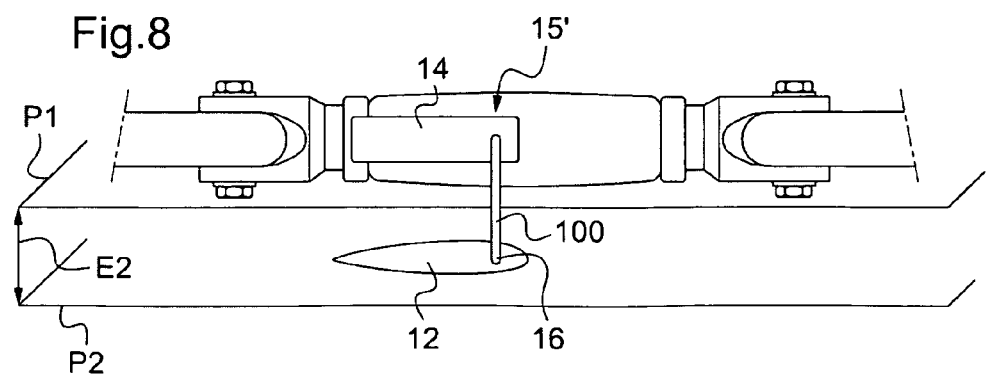

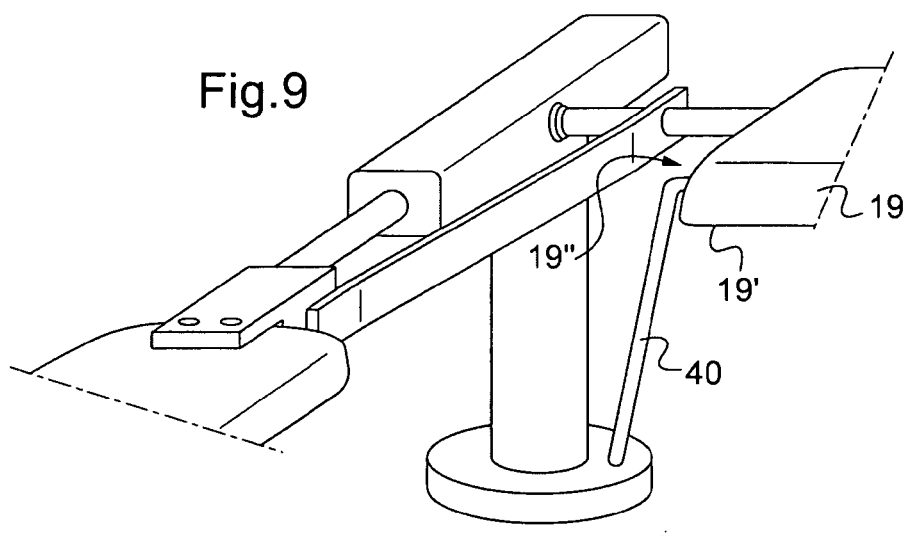
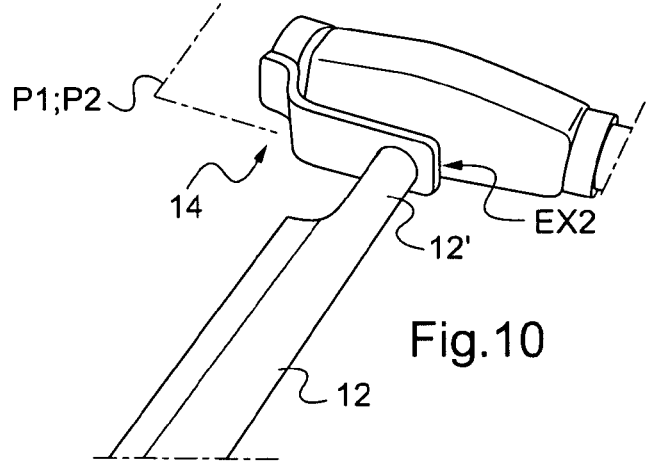
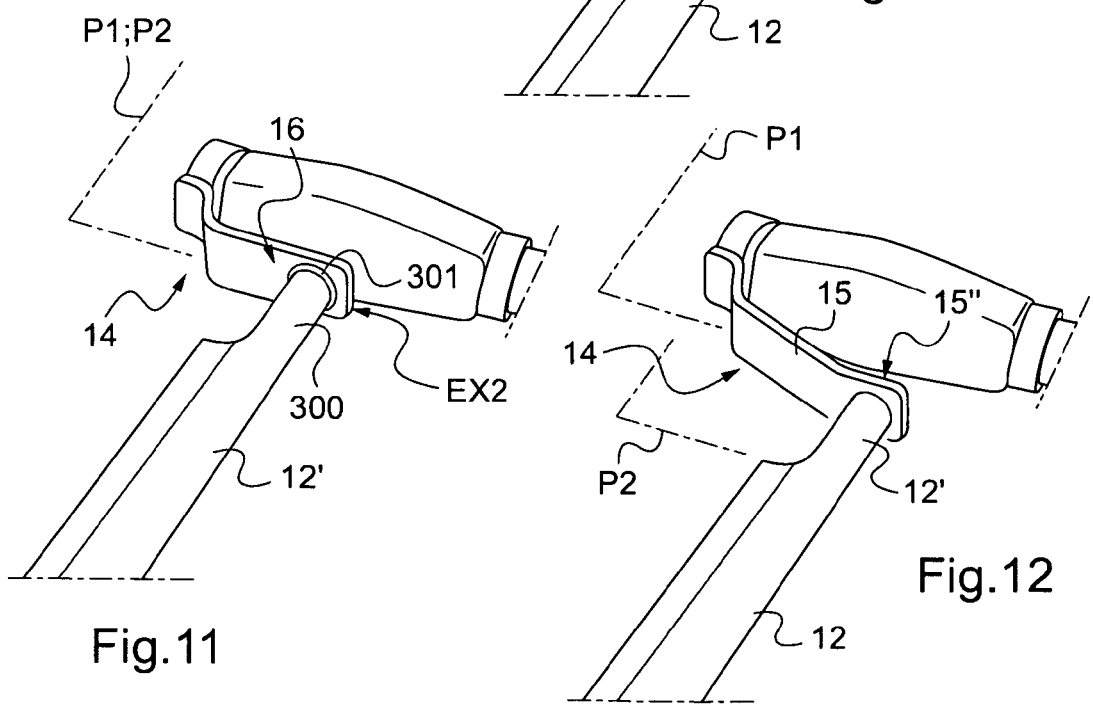
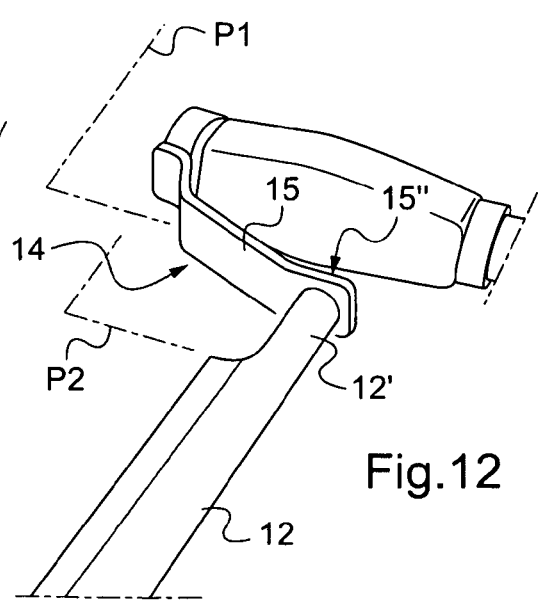

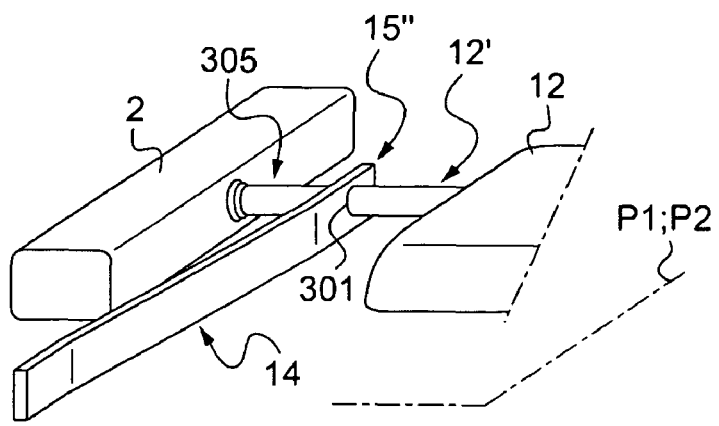
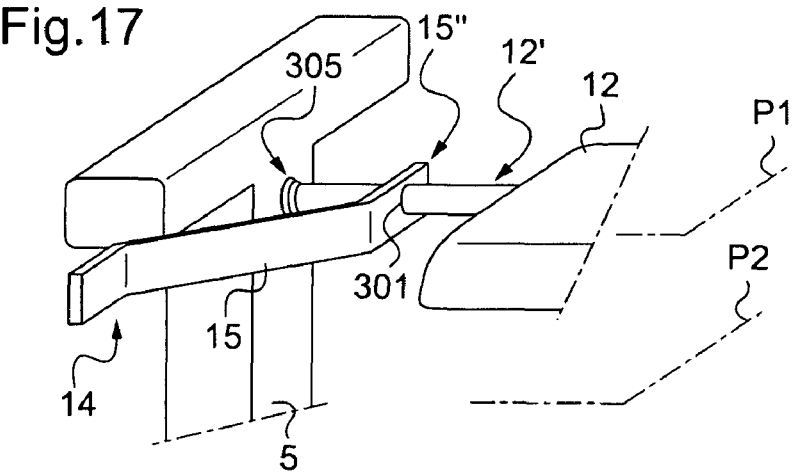
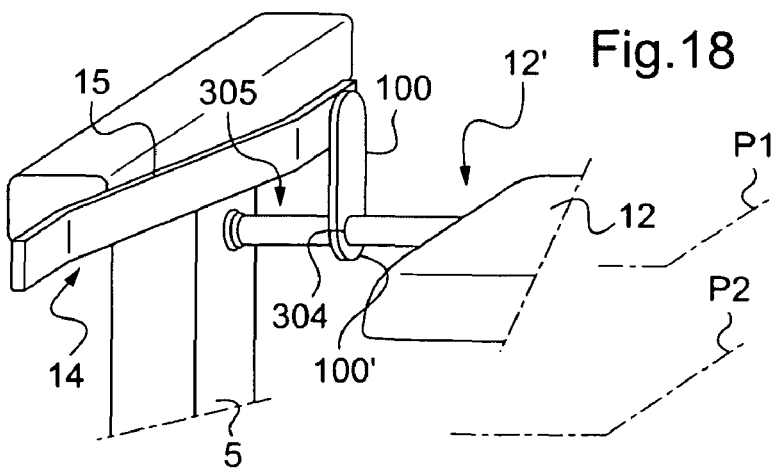

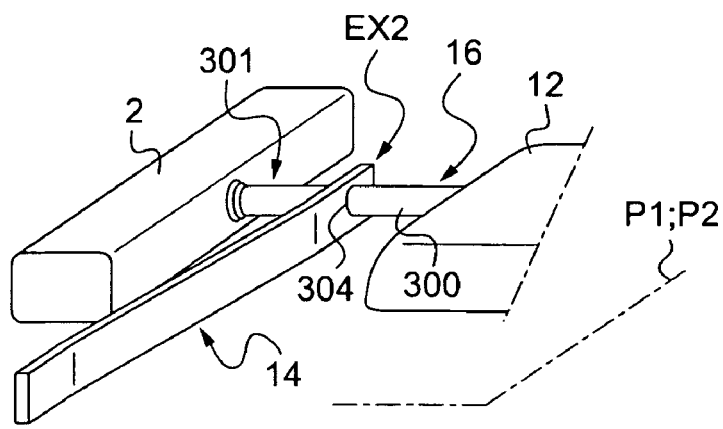
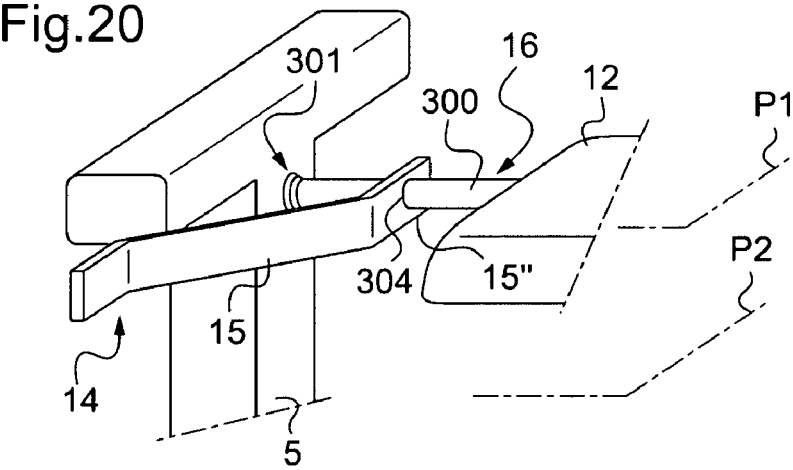
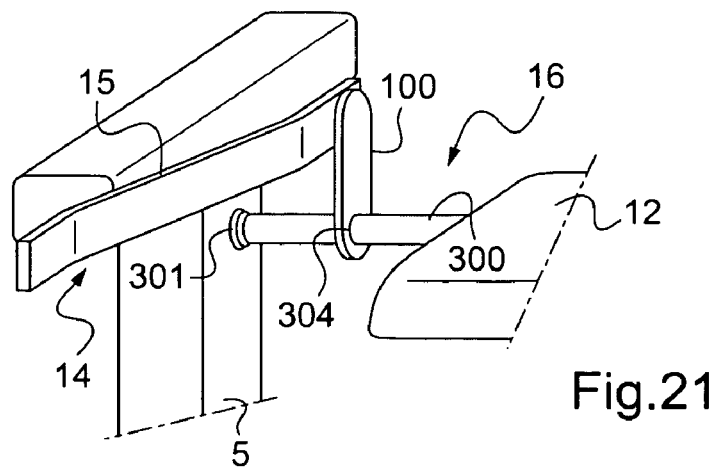

HELICOPTER PROVIDED WITH A PLURALITY OF LIFT ELEMENTS EACH PROVIDED WITH A RESPECTIVE TAB FOR CONTROLLING THE ANGLES OF INCIDENCE OF ITS BLADES

FIELD OF THE INVENTION

The present invention relates to a helicopter fitted with a plurality of lift elements for controlling the aerodynamic angles of incidence of the helicopter blades. Consequently, the invention lies in the narrow technical field of pitch controls for helicopter blades.

BACKGROUND OF THE INVENTION

A helicopter commonly has a main lift and propulsion rotor that is provided with a plurality of blades.

The blades of the main rotor describe a very flat cone, referred to as the "rotor cone" by the person skilled in the art, with the plane of rotation thereof being perpendicular to the general lift generated by the main rotor. This general lift of the main rotor may then be resolved into a vertical lift force and a horizontal force that drives the helicopter in translation.

Consequently, the main rotor provides a helicopter both with lift and with propulsion.

Furthermore, by controlling the shape and the angle of inclination of the rotor cone relative to the frame of reference of the helicopter, a pilot can control the helicopter with precision.

In order to act on the rotor cone, the blades are caused to flap so as to modify their angles of incidence relative to the drive plane of the rotor, said drive plane being perpendicular to the mast of the rotor.

As a result, the helicopter is provided with specific means serving to vary the pitch of each blade, and consequently to vary the aerodynamic angle of incidence of each blade relative to the incident stream of air through which the blade is passing.

By causing the pitch of a blade to vary, the lift it generates is modified, thereby causing the blade to flap.

In order to control the general lift of the rotor, both in magnitude and in direction, the helicopter pilot thus acts generally on the value of the pitch angle of each blade by causing the blade to turn about its longitudinal pitch axis.

Thus, when the pilot causes the pitch of the blades to vary collectively, i.e. causes identical variation in the pitch of all of the blades, that causes the magnitude of the general lift of the main rotor to be varied so as to control the altitude and the speed of the helicopter.

In contrast, collective pitch variation has no effect on the direction of said general lift.

In order to modify the direction of the general lift generated by the rotor, it is appropriate to cause the rotor cone to be inclined by causing pitch to vary cyclically as opposed to collectively. Under such circumstances, the pitch of a blade varies as a function of its azimuth direction, and during one complete revolution it passes from a maximum value to a minimum value, which values are obtained in diametrically opposite azimuth directions.

Causing the pitch of the blade to vary cyclically gives rise to cyclical variation in the lift of the blade and thus varies the angle of inclination of the rotor cone. By controlling cyclic pitch variation of the blades, the pilot controls the attitude of the aircraft and its movement in translation.

U.S. Pat. No. 2,534,353 discloses a first device for controlling the pitch of the blades of a helicopter.

According to that document, a helicopter rotor is fitted with two blades each secured to a sleeve that is attached to a hub.

The pilot controls the collective pitch of the blades by means of a lever acting on a rod housed inside the rotor mast. The rod delivers its movement to first and second rods attached to the hub. By moving the collective pitch control lever, the pilot causes said rod to move in translation, thereby causing the hub, and consequently the blades, to turn about a pitch variation axis.

The hub is also secured to first and second lift elements arranged in the plane of the blades via first and second connection shafts rigidly connected together, the longitudinal axis of the lift elements being perpendicular to the longitudinal axes of the blades. These lift elements are referred to as "paddles" by the person skilled in the art.

Each connection shaft is also connected to a control plate known as a swashplate via scissors linkage. More precisely, the swashplate comprising a rotary plate and a non-rotary plate, the scissors linkage are secured to the rotary plate of the swashplate.

In addition, the non-rotary plate has a stick that the pilot can grasp.

In order to control the cyclic pitch of the blades, the pilot moves the stick to incline the non-rotary plate, and consequently to incline the rotary plate. The inclination of the rotary plate is then transferred to the first and second connection shafts via the scissors linkage, thereby enabling the pitch of the lift elements to be modified.

The lift generated by the lift elements thus varies, thereby causing them to flap and consequently causing the hub to tilt.

As a result of the hub tilting, the two blades have their own pitch modified.

That first device is relatively simple but it requires the presence of a swashplate that is penalizing both aerodynamically and in terms of weight.

Furthermore, it requires the presence of two subassemblies, respectively for controlling collective pitch variation and for controlling cyclic pitch variation of the blades, thereby leading to large weight and increasing the risk of breakdown.

Finally, the lift elements are supposed to cause the pitch of the blades to vary cyclically. Nevertheless, that does not really happen, strictly speaking, insofar as both lift elements act together on the hub and thus on both blades simultaneously and in identical manner.

Furthermore, it is found that the forces that the pilot needs to deliver in order to incline the lift elements, when acting on the stick of the non-rotary plate, can sometimes be extremely large.

To remedy this particular drawback, a second device is known from U.S. Pat. No. 2,818,123.

According to that document, each lift element is fitted with a tab. The scissors linkages arranged on the rotary plate do not entrain pitch variation of the lift elements, but may cause the tabs to be inclined relative to said lift elements.

By varying the inclination of a tab, the lift of the assembly comprising the lift element and the tab is modified, and consequently the pitch of the blades is modified.

The force the pilot needs to exert in order to vary the pitch of the blades is thus less than in the first device insofar as the lift surface area of the tab is small compared with the lift surface area of the lift elements.

Nevertheless, the above-mentioned drawbacks remain. Furthermore, those first and second devices are, a priori, not applicable to a helicopter having more than two blades insofar as the hub can only turn about a single axis during cyclic pitch variation.

Document DE 2 409 227 discloses another device provided with two lift elements secured to the ends of a single beam passing through the head of the rotor.

Moreover, the state of the art includes a third device used on the modern helicopter.

The collective and cyclic pitch controls of the pilot are connected to three servo-controls via rods and mixers or indeed electrical controls that are secured to the non-rotary plate of a swashplate.

The swashplate is also mechanically linked to each blade by a pitch control rod.

When the pilot seeks to modify the collective pitch of the blades, action is taken on a control that causes the three servo-controls to raise or lower the swashplate assembly, i.e. both the non-rotary plate and the rotary plate.

The pitch control rods are then all moved through the same distance, which implies that the pitch of all the blades varies through the same angle.

In contrast, in order to vary the cyclic pitch of the blades so as to steer the helicopter in a given direction, the pilot causes only one of the servo-controls to move, for example.

The swashplate does not move vertically but instead tilts relative to the mast of the rotor. Each pitch control rod then moves in a direction and through a distance that are specific thereto and the same applies to the pitch of the associated blade.

Pitch control is to some extent individualized, unlike the first and second devices, since each blade is controlled by its own pitch control rod.

That third device is very effective, which explains why it has become widespread. Nevertheless, the forces that need to be applied to control the blades are large, particularly on heavy helicopters, so the servo-controls and the swashplate present weights and dimensions that are large, which is penalizing.

Furthermore, their presence tends to create aerodynamic disturbances.

OBJECT AND BRIEF SUMMARY OF THE INVENTION

An object of the present invention is thus to propose a helicopter that makes it possible to overcome the above-mentioned limitations.

Thus, the invention seeks to obtain a device and a method for changing the pitch of the blades of the main rotor of a helicopter that are simultaneously light in weight and effective in providing full control over the collective and cyclic pitch of the blades, regardless of the number of rotor blades.

According to the invention, a method of varying the pitch of a blade of a helicopter rotor having at least two blades is remarkable in that a lift element provided with a tab at the level of its trailing edge being connected solely to said blade, and the lift generated by said lift element is adjusted by tilting the tab relative to the lift element so that the lift element performs a flapping movement to entrain the blade to which it is connected in pivoting about a first longitudinal axis for varying the pitch of said blade.

By tilting the tab, a pilot necessarily modifies the lift of the assembly comprising the tab and the lift element.

Each lift element is then managed independently, both functionally and mechanically so as to vary the pitch of a single blade individually.

In a first embodiment, the variation in the lift of the tab and lift element assembly causes said tab and lift element assembly to perform a flapping movement and consequently to pivot the associated blade about the corresponding first longitudinal axis for varying pitch.

Thus, moving the tab gives rise directly to variation in the overall lift of the tab and lift element assembly by modifying the general curvature of the profile of said assembly.

In a second embodiment, the tilting of the tab causes the lift element to turn about the corresponding second longitudinal axis for varying the pitch of the lift element. The variation in the pitch of the lift element gives rise to a variation in its lift. The lift element performs a flapping movement and turns the associated blade about the corresponding first longitudinal axis for varying the pitch of the blade.

Unlike the first embodiment, varying the tilt of the tab gives rise to variation in the moment of the lift element. The angle of incidence of the lift element then varies, thereby varying the lift of the lift element.

It should be observed that in the first and second prior art devices using two lift elements, both lift elements act together on the hub of the rotor, thereby causing both blades to pivot. In contrast, in the method of the invention, the lift of one lift element is modified and that acts directly on a single blade.

The invention also provides a helicopter implementing the claimed method.

According to the invention, a helicopter is provided with a main rotor having at least two blades, each blade being provided with attachment means attaching it to a hub of the rotor. It should be observed that the attachment means for attaching the blade to the hub may comprise a sleeve secured in the usual way, or may comprise a sleeve that forms an integral portion of the blade, for example.

The helicopter is remarkable in that it is provided with one lift element per blade, said lift element being provided with a tab. Furthermore, each lift element is mechanically connected to a single blade, i.e. the single corresponding blade with which the lift element is associated, for the purpose of varying the pitch of said single blade to which the lift element is connected.

Since each lift element is mechanically linked to one blade, each lift element is advantageously constrained in rotation with the blade with which it is mechanically linked to pivot about a first longitudinal axis for varying the pitch of the blade.

Consequently, whatever the embodiment, tilting the tab causes the associated lift element to perform a flapping movement, thereby acting via the mechanical connection to cause one blade to pivot about the corresponding first longitudinal axis for varying the pitch thereof.

The lift element thus controls the pitch of the blade directly, and not for example via the hub of the rotor.

In addition, the pitch of each blade is thus controlled by a lift element that is associated with the attachment of the blade. Unlike the first and second devices of the prior art, each blade is thus indeed controlled by its own lift element.

Furthermore, the system is workable regardless of the number of blades, insofar as the lift elements need not necessarily be at an angle of 90° relative to the blades, and need not lie in the same plane as the blades. The invention is applicable to a helicopter having at least two blades but not necessarily only two blades, and that constitutes a distinct advantage.

Compared with the third prior art device, it is easier to move a lift element of small dimensions rather than a relatively large blade. In addition, the aerodynamic effect generated by the lift element enables the forces that need to be exerted to be limited.

Furthermore, the invention may include one or more of the following additional characteristics.

To vary collective pitch, action is taken on all of the lift elements so that the lift elements flap in identical manner, whereas to vary cyclic pitch, action is individualized.

Consequently, it is advantageous for each lift element to be mechanically connected to the single corresponding blade via a mechanical connection that is independent of the hub of the rotor, the mechanical connection advantageously connecting the lift element to the attachment means of the blade.

Thus, the mechanical connection does not include the rotor hub, unlike the first and second prior art devices in which each lift element is mechanically linked to the hub and causes the hub to tilt.

More precisely, in the first embodiment, each lift element is mechanically connected to a single corresponding blade by a mechanical connection, the mechanical connection optionally having a first end secured to the attachment zone of the blade, i.e. either to the fastener means for fastening the blade to the hub or to the root of the blade itself, the lift element being secured at a second end of the mechanical connection so that the lift element and the mechanical connection are constrained to pivot about a flapping axis of said lift element.

The lift element thus has one or two degrees of freedom so as to be capable firstly of flapping about its flapping axis, and secondly of optionally moving under the effect of drag. Since the lift element is secured to the mechanical connection, e.g. via an attachment of a first type having one or two degrees of freedom, tilting the tab causes said lift element directly to perform a flapping movement and consequently causes the blade to pivot.

In a second embodiment, each lift element is mechanically attached to a single blade by a mechanical connection, said mechanical connection includes a first end secured to the attachment means of the blade, and said lift element is constrained to pivot about the flapping axis of said lift element with a second end of the mechanical connection via a pitch hinge enabling the lift element to perform pivoting movement about a second longitudinal axis for varying the pitch of the lift element.

In this embodiment the lift element has two or three degrees of freedom so as to be capable of flapping about its flapping axis and of performing a pivoting movement so that the pitch of said lift element is caused to vary. Furthermore, the pitch hinge optionally allows for movement under the effect of drag.

Tilting the tab thus leads to a change in the pitch of the lift element and consequently to it performing a flapping movement, and thus causing the corresponding blade to pivot.

Whatever the embodiment, the forces that need to be applied in order to cause a lift element of small dimensions to pivot about the corresponding second longitudinal axis are much smaller than the forces needed to cause a blade to pivot about the corresponding first longitudinal axis for varying its pitch, e.g. by applying the techniques implemented by the third prior art device.

Consequently, it becomes possible to simplify the system for changing blade pitch. In spite of the extra weight due to the lift elements and their mechanical connections, the invention remains surprisingly advantageous compared with the third known device.

In first and second variants of these embodiments, the mechanical connection is a bent bar.

Thus, in accordance with the first embodiment, the first end zone of the bent bar, and thus the first end of the mechanical connection, is rigidly connected to the attachment zone of the blade.

Furthermore, the lift element is secured to a second end zone of the bent bar, i.e. the second end of the mechanical connection, so that the lift element and the mechanical connection are constrained to pivot together about a flapping axis of said lift element. The root of the lift element then passes through an orifice in said second end zone.

In accordance with the second embodiment, the first end zone of the bent bar is rigidly connected to the attachment zone of the blade. In contrast, the lift element is secured by a pitch hinge to a second end zone of the bent bar, i.e. to the second end of the mechanical connection, so that the lift element and the mechanical connection are constrained to pivot together about a flapping axis of said lift element, said pitch hinge allowing the lift element to perform pivoting movement about a second longitudinal axis for varying the pitch of the lift element.

Advantageously, the pitch hinge includes support means and an attachment of a second type having two or three degrees of freedom, the support means being rigidly attached to the root of the lift element and to the attachment of a second type having two or three degrees of freedom.

Furthermore, according to the first variant of the arrangement of the lift elements, the blades (when not flapping) being contained in a first plane, the lift elements that are mechanically connected to said blades being contained in a second plane (likewise when not flapping), the first and second planes coincide.

In contrast, in a second variant of the arrangement of the lift elements, the first and second planes are mutually parallel, with one plane being above the other.

The second variant consists in offsetting the first and second planes a little, by an order of magnitude matching the thickness of the lift elements, with the bent bars that link the lift elements to the attachment zone of the corresponding blades being inclined so as to eliminate the effects of gravity on the lift elements.

Indeed, the weight of the lift elements tends to cause them to flap downwards and that would cause the blades to pivot in a manner not required by the pilot.

But, surprisingly, when the second plane is situated a little below the first plane, by being offset a short distance of the order of the thickness of the lift element, it is found that the centrifugal forces exerted on the lift elements when the rotor is revolving straightens out the lift elements in such a manner as to counter the harmful influence of their weight.

In a third variant, the first and second planes are offset substantially, by the order of magnitude of the chord of the lift elements, with this being made possible with the help of an intermediate link, thereby extending the field of application of the invention to a rotor possessing any number of blades. In addition, this third variant makes it possible to optimize the aerodynamic characteristics of the rotor.

The mechanical connection then has a bent bar hinged to an intermediate link. The first end of the mechanical connection thus corresponds to the first end zone of the bent bar, i.e. the end of the bent bar that is not connected to the intermediate link. Similarly, the second end of the mechanical connection is represented by the free end of the intermediate link, i.e. the end of the intermediate link that is not connected to the bent bar.

Depending on the embodiment, the free end of the main rod is connected directly to the root of the lift element, or to the pitch hinge of said lift element.

Whatever the variant, it is then possible to attach the lift element rigidly to the second end of the mechanical connection either directly or via its pitch hinge, depending on the embodiment.

In a lightweight configuration, each lift element is supported solely by its mechanical connection.

Nevertheless, it is advantageous to support each lift element in some other way.

In a reinforced configuration of the first embodiment, the root of the lift element passes through the second end of the mechanical connection to be attached to a rotary unit, i.e. to the mast or to the hub of the rotor, or to the attachment means attaching the blade to the hub of the rotor, via an attachment of a first type having one or two degrees of freedom.

In addition, it should be observed that the attachment of a first type having one or two degrees of freedom is dimensioned to minimize the distance between the flapping axis of the lift element and the first longitudinal axis for varying the pitch of the corresponding blade, so that said flapping axis and said first longitudinal axis substantially coincide.

In the first variant, and possibly also in the second variant of this first reinforced embodiment, the attachment of a first type having one or two degrees of freedom is thus attached to the hub of the rotor, whereas in the third variant it is attached to the mast of the rotor, or to a member extending said mast.

In a reinforced configuration of the second embodiment, the pitch hinge of each lift element is provided with support means and with an attachment of a second type having two or three degrees of freedom. The support means are secured to the corresponding lift element, with the attachment of a second type having two or three degrees of freedom being attached to a rotary unit corresponding to the mast of the rotor and to its hub, and also to the attachment means attaching the blades to the hub.

The support means then pass through the second end of the mechanical connection so as to enable the lift element to perform pivoting movement about the corresponding second longitudinal axis for varying its pitch and thereby cause the mechanical connection to pivot about its flapping axis.

In addition, it should be observed that the attachment of a second type having two or three degrees of freedom, e.g. a spherical stop, is dimensioned so as to minimize the distance between the flapping axis of the lift element and the first longitudinal axis for varying the pitch of the corresponding blade so that said flapping axis and said first longitudinal axis substantially coincide.

In the first variant, and optionally in the second variant of this second embodiment, the attachment of a second type having two or three degrees of freedom is thus attached to the hub of the rotor, whereas in the third variant it is attached to the mast of the rotor, or to a member extending said mast.

Consequently, the following lightweight configurations may be envisaged:
- the root of each lift element is attached to the second end of the mechanical connection, either directly or via the attachment of a second type having two or three degrees of freedom of a pitch hinge, the first plane containing the blades (when not flapping) coinciding with the second plane containing the lift elements (when not flapping);
- the mechanical connection comprises a bent bar, the root of each lift element being attached to the second end zone of the bar, either directly or via the attachment of a second type having two or three degrees of freedom of a pitch hinge, the first and second planes being offset a little from each other; or
- the mechanical connection comprises a bent bar and an intermediate link, the root of each lift element is attached to the free end of the intermediate link, either directly or via the attachment of a second type having two or three degrees of freedom of a pitch hinge, the first and second planes being offset substantially from each other.

In addition, the following reinforced configurations may be envisaged:
- the root of each lift element passes through the second end of the mechanical connection to be attached to the rotary unit of the rotor via an attachment of a first type having one or two degrees of freedom, said mechanical connection being arranged in the first plane of the blades;
- the mechanical connection comprises a bent bar, the root of each lift element passes through the second end zone of the bent bar to be attached to the rotary unit of the rotor by an attachment of a first type having one or two degrees of freedom, the first and second planes being offset a little from each other;
- the mechanical connection comprises a bent bar and an intermediate link, the root of each lift element passes through the free end of the intermediate link to be attached to the rotary unit of the rotor via an attachment of a first type having one or two degrees of freedom, the first and second planes being offset substantially from each other;
- the support means of each pitch hinge of each lift element pass through the second end of the mechanical connection to be attached to the rotary unit of the rotor by an attachment of a second type having two or three degrees of freedom, said mechanical connection being arranged in the first plane of the blades;
- the mechanical connection comprises a bent bar, the support means of each pitch hinge of each lift element pass through the second end zone of the bent bar to be attached to the rotary unit of the rotor by an attachment of a second type having two or three degrees of freedom, the first and second planes being offset a little from each other;
- the mechanical connection comprises a bent bar and an intermediate link, the support means of each pitch hinge of each lift element pass through the free end of the intermediate link to be attached to the rotary unit of the rotor by an attachment of a second type having two or three degrees of freedom, the first and second planes being offset substantially relative to each other.

Furthermore, the rotor may optionally include stop means for limiting the flapping of each lift element.

This characteristic guarantees a degree of safety for the system by preventing the flapping of the lift elements being excessive, and consequently limiting the pitch movements of the blades.

The stop means are provided with a top plate that lies over a top portion of the rotor hub, at least in part, said top portion being situated on the side of the hub that is remote from the helicopter fuselage.

In a first version of the stop means, each lift element is mechanically linked to a blade successively via a pitch hinge and a mechanical connection, and the stop means include one stroke limiter per lift element. Each stroke limiter, e.g. an actuator, is then arranged between the top plate and the corresponding hinge so as to limit the flapping of the corresponding lift element.

The flapping of each lift element is then limited by the stroke of the associated stroke limiter.

In a second version of the stop means, the stop means are provided with a bottom plate that lies under a bottom portion of the rotor hub, at least in part, the bottom portion being situated on the side of the hub that faces the helicopter fuselage.

The flapping of the lift element, or of its pitch hinge with the mechanical connection linking it to a blade, is then limited by the bottom or top plates. In the event of excessive flapping, the lift element or its pitch hinge, as the case may be, comes into contact with the top or bottom plate which then stops its movement.

The top and bottom plates may optionally be provided locally with damper means to avoid degrading the lift element or its pitch hinge on coming into abutment.

Furthermore, in order to enable the pilot to control the tilt of the tabs, in a first form of the tab control system, the main rotor includes a pitch control swashplate provided with a rotary plate and with a non-rotary plate, and each tab is connected to the rotary plate by a main rod.

The pilot controls the swashplate, e.g. via servo-controls, to cause the tilt of the tabs to vary relative to the lift elements to which they are connected, and consequently to modify the pitch of the blades.

For given blade size, the servo-controls of the invention have dimensions and weight that are optimized, and advantageously reduced, relative to the servo-controls implemented by the third known device.

In a second form of the tab control system, the rotor includes at least one actuator per tab arranged on the associated lift element to adjust the tilt of the tab relative to the lift element to which it is attached.

The actuator may be powered electrically via slip rings arranged on a rotary mast of the rotor.

Nevertheless, it is advantageous for the actuator to be powered electrically via an electricity generator comprising a stator arranged inside the rotary mast of the rotor.

Independently of the way the actuator is powered electrically, such a power system means that it is no longer necessary to use a swashplate.

Furthermore, in order to simplify the system, each actuator is optionally controlled by wireless transmission means using electromagnetic waves lying in the radiofrequency, infrared, or indeed microwave frequency ranges.

Finally, the actuator is advantageously a piezoelectric actuator generating angular movement. This characteristic is particularly surprising for the person skilled in the art.

Piezoelectric actuators generate movements of small amplitude, so such actuators are normally not used in such an application. Nevertheless, given the aerodynamic amplification achieved by the lift element, a small amount of tilt suffices for the tab, thereby making it possible to use a piezoelectric actuator for this purpose.

BRIEF DESCRIPTION OF THE DRAWINGS

The invention and its advantages appear in greater detail from the following description of embodiments given by way of illustration with reference to the accompanying figures, in which:

FIG. 4 is a side view of a first version of the stop means;

FIG. 5 is a side view of a second version of the stop means;

FIG. 6 is a side view of a first variant of the arrangement of the lift elements;

FIG. 7 is a side view of a second variant of the arrangement of the lift elements;

FIG. 8 is a side view of a third variant of the arrangement of the lift elements;

FIG. 9 is a view showing an arrangement of a main rod in association with a tab; and FIGS. 10 to 21 are diagrammatic figures explaining the various configurations of the invention.

Elements present in more than one of the figures are given the same references in each of them.

MORE DETAILED DESCRIPTION

Figure 1:
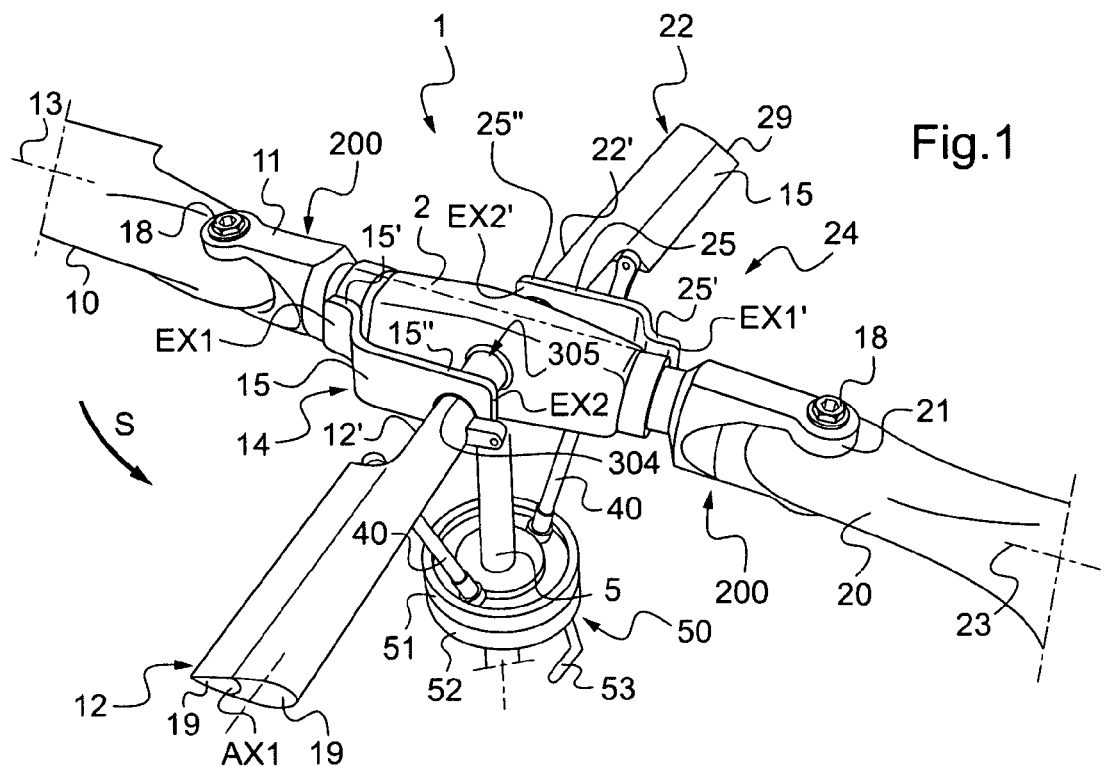
FIG. 1 is an isometric view of a first embodiment of the invention relating to the first form of the control system.

FIG. 1 shows a helicopter rotor 1. The rotor 1 is fitted with first and second blades 10, 20 provided respectively with first and second attachment means 11, 21 for attaching them to the hub 2 of the rotor 1. The attachment means 11, 21 are attached to the hub 2 by the usual means (not shown) via laminated spherical stops for example, serving, amongst other things, to enable each blade 10, 20 to pivot about the corresponding first longitudinal axis 13, 23 for varying pitch.

In the figures, the blades 10, 20 are secured to their attachment means 11, 21 by pins 18.

Nevertheless, the attachment means may form integral portions of the blades without going beyond the ambit of the invention. For example, each attachment means may be constituted by a sleeve incorporated in the blade. In the description below, each blade does indeed have its own attachment means.

In addition, the rotor 1 includes one lift element 12, 22 per blade, each lift element being situated upstream from the associated blade relative to the direction of advance S of said associated blade. Thus, first and second lift elements 12, 22 are respectively mechanically linked to the first and second blades 10, 20 via first and second mechanical connections 14, 24. More precisely, the first and second lift elements 12, 22 are linked respectively to the attachment means 11, 21 in the attachment zone 200 of the first and second blades 10, 20.

Each lift element 12, 22 includes a trailing edge tab 19, 29 to enable a pilot to modify the lift of the lift element 12, 22. The tab 19, 29 is arranged in the usual manner on the associated lift element 12, 22.

Each mechanical connection 14, 24 is provided with a bent bar 15, 25. Each mechanical connection 14, 24 is secured via its first ends EX1, EX1' to a blade 10, 20, i.e. via the first end zone 15', 25' of each bent bar 15, 25.

In the first embodiment shown in FIG. 1, each second end EX2, EX2' of the mechanical connections 14, 24 is secured to the associated lift element 12, 22 in such a manner that each lift element 12, 22 is constrained in pivoting with the corresponding mechanical connection 14, 24 about the flapping axis 303 of the lift element.

Thus, a first end EX1 of the first mechanical connection 14, i.e. the first end zone 15' of the bent bar 15, is secured to the first attachment means 11, e.g. via screws (not shown). The second end EX2 of the first mechanical connection 14, i.e. the second end zone 15" of the bent bar 15, is constrained to pivot about the flapping axis 303 of the first lift element 12, with the root 12' of the lift element 12 passing through an orifice 304 of the second end EX2 of the first mechanical connection 14.

Similarly, a first end EX1' of the second mechanical connection 15 is secured to the second attachment means 21, while the second end EX2' of the second mechanical connection 15 is secured to the second lift element 22.

In this first embodiment, the helicopter pilot causes one or more tabs 19, 29 to tilt in order to adjust the lift of the associated lift elements 12, 22.

For example, by tilting the first tab 19 about its tilt axis AX1, the pilot modifies the lift generated by the assembly constituted by the first lift element 12 and the first tab 19. As a result, the lift element performs a flapping movement and entrains pivoting of the first blade 10 about the corresponding first longitudinal axis 13 for varying its pitch.

Similarly, by tilting the second tab 29, the pilot modifies the lift generated by the second assembly comprising the second lift element 22 and the second tab 29 independently of the first assembly comprising the first lift element 12 and the first tab 19. Thus, the lift element 22 performs a flapping movement and entrains pivoting of the second blade 20 about the corresponding first longitudinal axis 23 for varying pitch.

Figure 2:
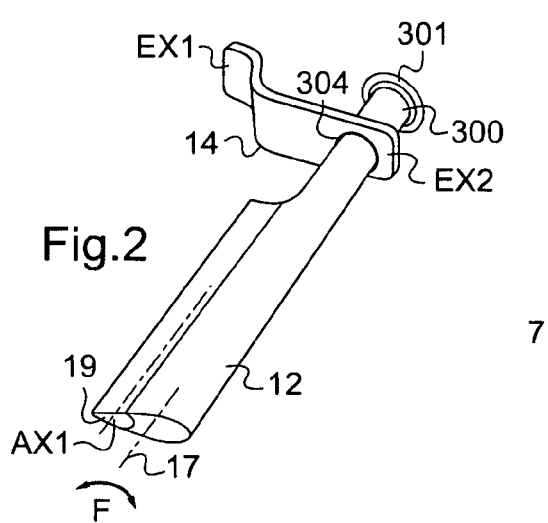
FIG. 2 is a diagrammatic view explaining a second embodiment of the invention.

In the second embodiment shown in FIG. 2, each bent bar 15, 25 is secured via its second end EX2, EX2' to a pitch hinge 16 of the lift element 12, 22 associated with said blade 10, 20. By means of this pitch hinge 16, the lift element is suitable for performing pivoting movement about the corresponding second longitudinal axis 17 for varying its pitch.

Thus, a first end EX1 of the first bent bar 15 is secured to the first attachment means 11, e.g. by screws (not shown), while an orifice 304 in the second end EX2 of said first bent bar 15 holds support means 300 for supporting the pitch hinge 16 of the first lift element 12. The first pitch hinge 16 then allows the first lift element 12 to pivot about the corresponding second longitudinal axis 17 for varying pitch, as represented by double-headed arrows F.

It can be understood that the same applies to all of the lift elements, and that this applies independently of each of them.

In this second embodiment, the helicopter pilot causes one or more tabs 19, 29 to tilt in order to adjust the lift of the associated lift element 12, 22.

For example, by tilting the first tab 19 about its tilt axis AX1, the pilot modifies the lift generated by the assembly comprising the first lift element 12 and the first tab 19. The lift element 12 thus pivots about the corresponding second longitudinal axis 17 and performs a flapping movement. Consequently, the first lift element 12 causes the first blade 10 to pivot about the corresponding first longitudinal axis 13 for varying its pitch.

As a result, when the first lift element 12 performs a flapping movement, it pivots about the longitudinal axis 13 of the first blade 10. Since the lift element 12 is mechanically connected to the attachment means 11 of the first blade 1, the first blade in turn pivots about the first longitudinal axis 13. The pitch of the first blade 1 is thus modified.

It should be observed that the second embodiment is particularly advantageous in that advantage is taken of a strong aerodynamic effect for varying the pitch of the lift element. Causing the tab to tilt requires less force when implementing the second embodiment than when implementing the first.

Furthermore, in order to adjust the lift of each lift element 12, 22, the pilot controls the pitch of said lift elements with the help of a control system.

With reference to FIG. 1, in a first form of this control system, the rotor 1 is equipped with a swashplate 50. The swashplate 50 possesses a non-rotary plate 52 linked to a non-rotary zone of the helicopter by a scissors linkage 53. Although the non-rotary plate 52 is not driven in rotation by the helicopter engine installation, it can nevertheless be inclined relative to the mast 5 of the rotor 1 via means of a ball joint via servo-controls that are not shown and that are activated by the pilot.

Furthermore, the swashplate 50 has a rotary plate 51 constrained to rotate with the mast 5. It should be observed that the swashplate 50 is of the usual type known to the person skilled in the art.

Under such conditions, each tab 19, 29 is connected to the rotary plate 51 of the swashplate 50 by a main rod 40 connected to the root of the lift element.

The pilot causes the rotary plate to move by acting on the controls, with this movement serving to tilt the tabs of the lift elements via the main rods 40.

Figure 3:
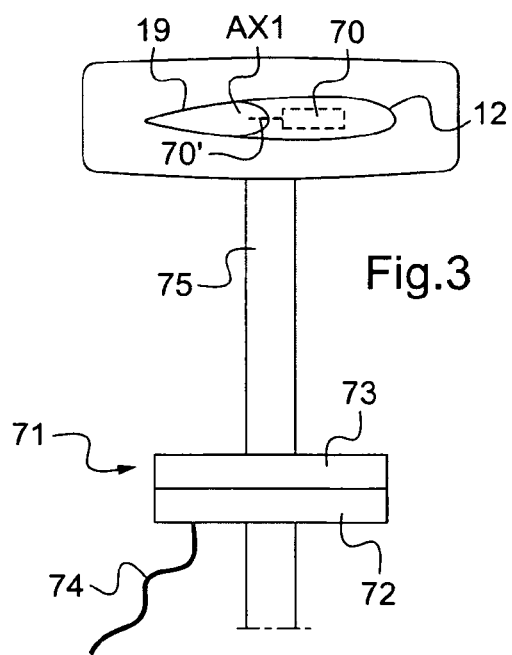
FIG. 3 is a diagrammatic side view showing the second form of the control system.

In the second form of the control system, as shown in FIG. 3, each tab 19 is secured to at least one actuator 70, said actuator being a piezoelectric actuator suitable for causing the tab to pivot about its tilt axis AX1.

The actuator may then generate angular movement of its outlet shaft 70', or else linear movement if it is fastened to an anchor point that is offset from the tab relative to its tilt axis AX1, as shown in FIG. 3.

Each actuator 70 is fastened to the associated lift element via its free end opposite from its mechanical connection 14, 24, for example.

Consequently, the helicopter includes electrical slip rings 71 of known type comprising a stator element 72 and a rotor element 73 carrying brushes or the equivalent, for passing electricity.

The rotor element 73 of the slip rings 71 is then connected by an electric cable 75 to the actuator 70, while the stator element 72 is connected by an electric cable 74 to an electrical power supply of the helicopter.

Optionally, it is possible to eliminate the slip rings 71 by replacing them with an electricity generator. The person skilled in the art then provides an electricity generator with the help of the mast 5 by placing a stator inside the mast.

The stator is then rigidly connected to the main transmission gearbox of the helicopter, while the rotor generator is associated with the mast 5.

Thus, when the helicopter engine installation rotates the rotor, the rotary movement of the mast enables the generator to generate electrical power for powering the actuators of the tabs of the lift elements.

With actuators that are powered electrically, whether via slip rings or via a generator, each actuator is fitted with a module for wirelessly receiving control signals.

The pilot then acts on the flight controls that transmit control signals to the receiver modules of the actuators in order to tilt the tabs.

It should be specified that using a lift element to vary the pitch of a blade serves to limit control forces compared with devices known in the prior art.

It thus becomes possible to use a piezoelectric actuator for controlling the collective pitch and the cyclic pitch of the helicopter. This observation is surprising insofar as such actuators are normally not appropriate for such use because of the small amounts of movement they deliver.

With reference to FIGS. 4 and 5, it can be seen that, whatever the embodiment, a helicopter is advantageously fitted with stop means 30 to limit the flapping of the lift elements.

These stop means 30 comprise a top plate 31 that lies over the hub 2 of the rotor 1 completely or in part. The top plate 31 thus faces the top portion 3 of the hub 2 that is furthest away from the fuselage of the helicopter.

In a first version of the stop means 30, shown diagrammatically in FIG. 4, the stop means 30 are also provided with a respective stroke limiter 32, e.g. an actuator, for each lift element.

Each actuator 32 is then fastened to the top plate 31 and to the associated lift element 12.

The predetermined stroke of the stroke limiter thus advantageously limits the flapping of the lift element 12.

In a second version shown in FIG. 5, the stop means 30 do not have a stroke limiter, but rather a bottom plate 33 lying under the bottom portion 4 of the hub 2, i.e. the portion closest to the helicopter fuselage.

The top and bottom plates 31 and 33 project from the hub 2. Thus, when flapping movement of the lift element exceeds a certain threshold, the lift element comes into contact with the top plate 31 or with the bottom plate 33, thereby stopping its movement.

Damper elements, e.g. an elastomer stop, may be arranged on the top and bottom plates 31 and 32 so that the hinge is not damaged by the impact that results from coming into contact.

Furthermore, with reference to FIGS. 6 and 7, the blades 10, 20 are all contained in a first plane P1 when they are not flapping. The first plane P1 thus contains the first longitudinal axes 13, 23 for varying the pitch of the blades 10, 20.

Similarly, the lift elements are all contained in a single plane P2. Thus, the second plane P2 contains the second longitudinal axes 17, 27 for varying the pitch of the lift elements 12, 22.

In a first variant shown in FIG. 6, the first and second planes P1 and P2 coincide.

Nevertheless, in a second variant shown diagrammatically in FIG. 7, the first and second planes P1 and P2 are offset relative to each other, the first plane P1 being situated a little above the second plane P2.

The offset E1 existing between the first and second planes P1, P2 is of the same order as the thickness of the lift element.

Finally, in the third variant shown in FIG. 8, the offset E2 between the first and second planes P1, P2 is large, being of the same order as the chord of the lift element.

Thus, an intermediate rod 100 is arranged between the second end zone 15', 25' of each bent bar and the associated lift element 12.

In the first embodiment, the intermediate rod is secured directly to the lift element, whereas in the second embodiment, the free end of the intermediate rod has passing therethrough the support means for the pitch hinge of the corresponding lift element.

FIG. 9 is a diagrammatic view showing how the main rod 40 is attached in the first form of the control system. This main rod 40 is connected to the trailing edge 19' of the tab of the lift element.

In the second embodiment shown in FIG. 9, this arrangement generates coupling between pitch and flapping that is generally stabilizing for pitch.

It should be observed that in the first embodiment, the coupling would more likely be stabilizing. The main rod 40 should then preferably be connected to the leading edge 19" of the tab.

FIGS. 10 to 15 serve to illustrate lightweight configurations for the arrangement of each lift element.

In the first variant of the first embodiment of the lightweight configuration shown in FIG. 10, the root 12' of the lift element 12 is rigidly attached to the second end EX2 of the mechanical connection 14, the first plane P1 that contains the blades when they are not flapping coinciding with the second plane P2 that contains the lift elements when they are not flapping.

With reference to FIG. 11, in the first variant of the second embodiment of the lightweight configuration, the root 12' of the lift element 12 is rigidly attached to the support means 300 of the pitch hinge 16. In addition, the attachment 301 of a second type having two or three degrees of freedom belonging to this pitch hinge 16 is itself attached to the second end EX2 of the mechanical connection 14, the first plane P1 coinciding with the second plane P2 that contains the lift elements when they are not flapping.

FIG. 12 shows the second variant of the first embodiment of the lightweight configuration.

The mechanical connection 14 comprises a bent bar 15 that slopes downwards a little with the root 12' of the lift element 12 being attached to the second end zone 15" of the bent bar, and with the first and second planes being offset a little relative to each other.

Figure 13:
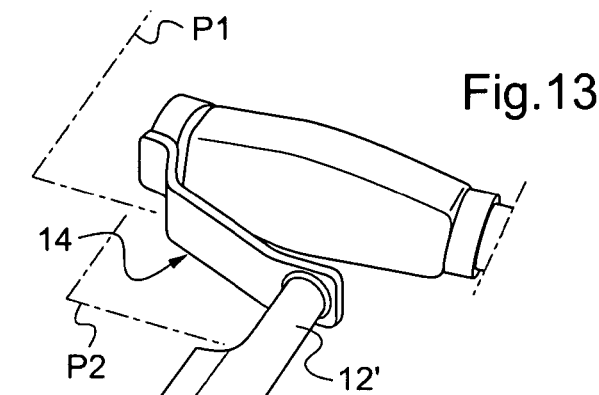

Similarly, with reference to FIG. 13, the second variant of the second embodiment of the lightweight configuration differs from the first variant of this embodiment in that the planes P1 and P2 are offset relative to each other.

Figure 14:
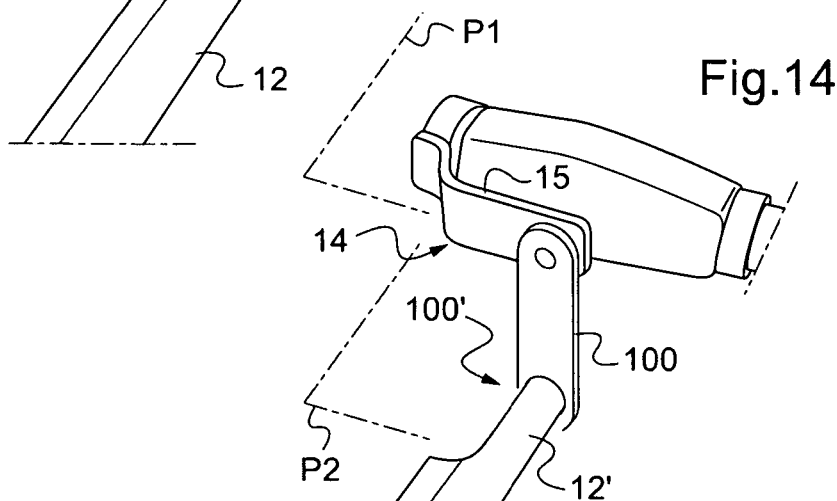

As shown in FIG. 14, in the third variant of the first embodiment of the lightweight configuration, the mechanical connection 14 comprises a bent bar 15 and an intermediate link 100 with the root 12' of the lift element being rigidly attached to the free end 100' of the intermediate link 100, the first and second planes P1 and P2 being offset substantially relative to each other.

Figure 15:
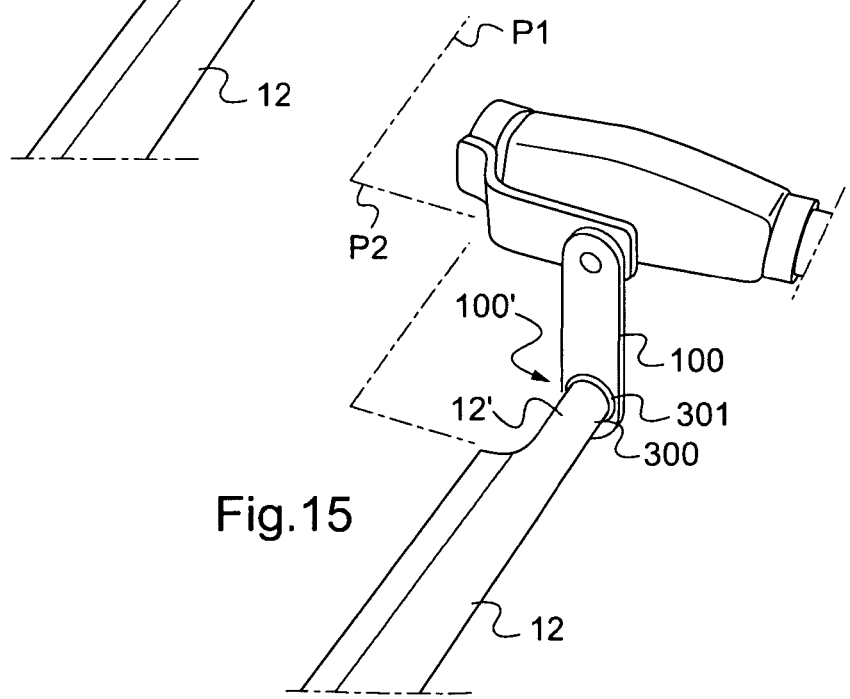

Finally, in the third variant of the second embodiment of the lightweight configuration, as shown diagrammatically in FIG. 15, the mechanical connection 14 comprises a bent bar 15 and an intermediate link 100 with the root 12' of the lift element rigidly attached to the support means 300 for the pitch hinge 16 of the lift element, said support means being attached to the attachment 301 of a second type having two or three degrees of freedom rigidly connected to the free end 100' of the intermediate link 100, the first and second planes P1 and P2 being offset substantially from each other.

Furthermore, FIGS. 16 to 21 show reinforced configurations of the invention.

With reference to FIG. 16, in the first variant of the first embodiment of the reinforced configuration, the root 12' of the lift element 12 passes through an orifice 304 of the second end EX2 of the mechanical connection 14 to be attached to the rotary unit of the rotor, specifically the hub 2, by an attachment 305 of a first type having one or two degrees of freedom, said mechanical connection 14 being arranged in the first plane P1 of the blades.

FIG. 17 shows the second variant of the first embodiment of the reinforced configuration. The mechanical connection comprises a bent bar 15, the root 12' of the lift element passes through an orifice 304 in the second end zone 15" of the bent bar 15 to be attached to the rotary unit of the rotor, e.g. the mast 5, via an attachment 305 of the first type having one or two degrees of freedom, the first and second planes being offset a little relative to each other.

FIG. 18 shows the third variant of the first embodiment of the reinforced configuration. The mechanical connection 14 comprises a bent bar 15 and an intermediate link 100, the root 12' of the lift element passes through an orifice 304 of the free end 100' of the intermediate link 100 to be attached to the rotary unit of the rotor, to its mast 5, via an attachment 305 of a first type having one or two degrees of freedom. The first and second planes P1 and P2 are offset substantially relative to each other.

With reference to FIG. 19, in the first variant of the second embodiment of the reinforced configuration, the support means 300 for the pitch hinge 16 of the lift element 12 pass through an orifice 304 in the second end EX2 of the mechanical connection 14 to be attached to the rotary unit of the rotor, the hub 2, by an attachment 301 of a second type having two or three degrees of freedom. The mechanical connection is then arranged in the first plane P1, and the first and second planes P1 and P2 coincide.

FIG. 20 shows the second variant of the second embodiment of the reinforced configuration. The mechanical connection 14 comprises a bent bar 15, the support means 300 for the pitch hinge 16 of the lift element 12 pass through the second end zone 15" of the bent bar 15 to be attached to the rotary unit of the rotor via an attachment 301 of a second type having two or three degrees of freedom, and the first and second planes P1 and P2 are offset a little relative to each other.

Finally, FIG. 21 shows the third variant of the second embodiment of the reinforced configuration.

The mechanical connection 14 comprises a bent bar 15 and an intermediate link 100, the support means 300 for supporting the pitch hinge 16 of the lift element 12 pass through an orifice 304 in the free end 100' of the intermediate link 100 to be fastened to the rotary unit of the rotor by an attachment 301 of a second type having two or three degrees of freedom, the first and second planes P1 and P2 being offset substantially relative to each other.

Naturally, the present invention is susceptible of numerous variations concerning the way in which it is implemented. Although several embodiments are described above, it will be understood that it is not conceivable to identify exhaustively all possible embodiments. It is naturally possible to envisage replacing any of the means described by equivalent means without going beyond the ambit of the present invention.

For example, the figures show a rotor having two blades and consequently two lift elements. Nevertheless, the invention can be adapted to a helicopter having some larger number of blades without any difficulty.

Furthermore, FIGS. 1 and 2 show that the bent bar mechanically connecting a lift element to a corresponding blade is attached via its first end to the attachment means of said blade.

Nevertheless, said first end of the bent bar need not be secured to the attachment means but could be secured to the blade itself, e.g. a root segment of the blade, particularly since the attachment means may be incorporated in the blade.

More generally, the bent bar is attached to the attachment zone 200 for attaching the blade to the rotor hub, as shown in FIG. 1.

What is claimed is:

1. A helicopter is provided with a main rotor (1) having at least two blades (10, 20), each blade (10, 20) being provided with attachment means (11, 21) attaching it to a hub (2) of the rotor (1), wherein the helicopter is provided with one lift element (12, 22) per blade (10, 20), said lift element being provided with a tiltable tab (19, 29), each lift element (12, 22) being mechanically connected to a single blade (10, 20) to vary the pitch of said single blade (10, 20).

2. A helicopter according to claim 1, wherein each lift element (12, 22) is constrained to pivot with the blade (10, 20) with which it is mechanically connected about a first longitudinal axis (13, 23) for varying the pitch of said blade (10, 20).

3. A helicopter according to claim 1, wherein each lift element (12, 22) is mechanically connected to a single blade (10, 20) by a mechanical connection (14, 24) that is independent of the hub (2) of the rotor (1), said mechanical connection (14, 24) includes a first end (EX1) that is secured to an attachment zone (200) of the blade (10), and said lift element (12, 22) is secured to a second end (EX2) of the mechanical connection (14, 24) to enable the lift element (12, 22) and the mechanical connection (14, 24) to be constrained to pivot together about a flapping axis (303) of said lift element (12, 22).

4. A helicopter according to claim 3, wherein the root (12') of each lift element (12, 22) passes through an orifice in said second end of the mechanical connection to be attached to a rotary unit via an attachment (305) of a first type having one or two degrees of freedom.

5. A helicopter according to claim 1, wherein each lift element (12, 22) is mechanically attached to a single blade (10, 20) by a mechanical connection (14, 24), said mechanical connection (14, 24) includes a first end (EX1) secured to the attachment means (11, 21) of the blade (10, 20), and said lift element (12, 22) is constrained to pivot about the flapping axis (303) of said lift element (12, 22) with a second end (EX2) of the mechanical connection (14, 24) via a pitch hinge (16, 26) enabling the lift element (12, 22) to perform pivoting movement about a second longitudinal axis (17, 27) for varying the pitch of the lift element (12, 22).

6. A helicopter according to claim 5, wherein the root (12') of each lift element (12, 22) passes through an orifice in said second end of the mechanical connection to be attached to a rotary unit via said pitch hinge (16, 26).

7. A helicopter according to claim 3, wherein said attachment zone (200) includes the attachment means (11, 21) of the blade (10) and a segment of said blade, and said first end (EX1) is secured to said attachment means (11, 21).

8. A helicopter according to claim 3, wherein said attachment zone (200) includes the attachment means (11, 21) of the blade (10) and a segment of said blade, and said first end (EX1) is secured to said segment.

9. A helicopter according to claim 3, wherein said mechanical connection (14, 24) is a bent bar.

10. A helicopter according to claim 3, wherein said mechanical connection (14) comprises a bent bar (15) hinged to an intermediate link (100), the first end (EX1) of the mechanical connection (14) corresponding to the first end zone (15') of the bent bar (15) that is not connected to the intermediate link (100), the second end (EX2) of the mechanical connection (100) being represented by the free end (100') of the intermediate link (100) that is not connected to the bent bar (15).

11. A helicopter according to claim 1, wherein the blades (10, 20) being contained in a first plane (P1) when they are not flapping, and the lift elements (12, 22) mechanically linked to said blades (10, 20) being contained in a second plane (P2) when they are not flapping, said first and second planes (P1, P2) coinciding.

12. A helicopter according to claim 1, wherein the blades (10, 20) being contained in a first plane (P1) when they are not flapping, and the lift elements (12, 22) mechanically linked to said blades (10, 20) are contained in a second plane (P2) when they are not flapping, said first and second planes (P1, P2) being mutually parallel.

13. A helicopter according to claim 1, wherein said rotor (1) includes stop means (30) for limiting the flapping of each lift element (12).

14. A helicopter according to claim 13, wherein said stop means (30) is provided with a top plate (31) lying over a top portion (3) of the hub (2) of the rotor (1), at least in part, said top portion (3) being situated on the side of the hub (2) that is remote from a fuselage of the helicopter.

15. A helicopter according to claim 14, wherein each lift element (12) is mechanically connected to a blade (10), said stop means (30) includes one actuator (32) per lift element (12), each actuator (32) being arranged between said top plate (31) and a corresponding lift element in order to limit the flapping of that lift element (12).

16. A helicopter according to claim 14, wherein said stop means (30) are provided with a bottom plate (33) covering a bottom portion (4) of the hub (2) of the rotor (1), at least in part, said bottom portion (4) being situated on the side of the hub (2) that faces the fuselage of the helicopter.

17. A helicopter according to claim 1, wherein said main rotor (2) includes a pitch control swashplate (50) having a rotary plate (51) and a non-rotary plate (52), each tab (19, 29) being connected to said rotary plate (51) by a main rod (40).

18. A helicopter according to claim 1, wherein said rotor (1) has at least one actuator (70) per tab (19, 29) arranged on the associated lift element in order to adjust the tilt of the tab (19, 29) relative to the lift element to which it is attached.

19. A helicopter according to claim 16, wherein said actuator (70) is powered electrically by slip rings (71) arranged on a rotary mast (5) of the rotor (2).

20. A helicopter according to claim 18, wherein said actuator (70) is powered electrically via an electricity generator comprising a stator arranged inside a rotary mast (5) of the rotor (2).

21. A helicopter according to claim 18, wherein said actuator (70) is controlled by wireless transmission means.

22. A helicopter according to claim 18, wherein said actuator (70) is a piezoelectric actuator generating angular movement.

23. A helicopter according to claim 1, wherein each lift element (12, 22) is managed in functionally and mechanically independent manner so as to vary the pitch of a single blade individually.

24. A method of varying the pitch of a blade of a helicopter rotor having at least two blades, wherein a lift element (12, 22) provided with a tab (19, 29) that is connected solely to said blade (10, 20), and the lift generated by said lift element (12, 22) is adjusted by tilting the tab (19, 29) relative to the lift element so that the lift element (12, 22) performs a flapping movement to entrain the blade (10, 20) to which it is connected in pivoting about a first longitudinal axis (13, 23) for varying the pitch of said blade (10, 20).

* * * * *